US010636110B2

United States Patent
Sathe

(10) Patent No.: US 10,636,110 B2
(45) Date of Patent: Apr. 28, 2020

(54) ARCHITECTURE FOR INTERLEAVED RASTERIZATION AND PIXEL SHADING FOR VIRTUAL REALITY AND MULTI-VIEW SYSTEMS

(71) Applicant: Intel Corporation, Santa Clara, CA (US)

(72) Inventor: Rahul P. Sathe, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/195,005

(22) Filed: Jun. 28, 2016

(65) Prior Publication Data

US 2017/0372519 A1 Dec. 28, 2017

(51) Int. Cl.
*G06T 1/60* (2006.01)

(52) U.S. Cl.
CPC .................................... *G06T 1/60* (2013.01)

(58) Field of Classification Search
CPC ... G06T 19/006; G06T 1/20; G06T 1/60; G06T 15/005; G06T 15/80
See application file for complete search history.

(56) References Cited

U.S. PATENT DOCUMENTS

| 2007/0154082 | A1* | 7/2007 | Rhodes | H04N 13/0003 |
| | | | | 382/154 |
| 2010/0328303 | A1 | 12/2010 | Akenine-Moller et al. | |
| 2011/0148919 | A1 | 6/2011 | Heggelund et al. | |
| 2012/0230580 | A1* | 9/2012 | Knee | H04N 13/0003 |
| | | | | 382/154 |
| 2013/0181992 | A1* | 7/2013 | Nilsson | G06T 15/405 |
| | | | | 345/426 |
| 2013/0300637 | A1* | 11/2013 | Smits | G03B 35/18 |
| | | | | 345/8 |
| 2013/0342547 | A1 | 12/2013 | Lum et al. | |
| 2014/0071128 | A1 | 3/2014 | Everitt et al. | |
| 2014/0240319 | A1* | 8/2014 | Syed | H04N 21/23436 |
| | | | | 345/428 |
| 2014/0375663 | A1 | 12/2014 | Pfaffe | |
| 2017/0085964 | A1* | 3/2017 | Chen | H04N 21/816 |

FOREIGN PATENT DOCUMENTS

JP 2009-517770 4/2009

OTHER PUBLICATIONS

Wojciech Matusik, "Graphics Pipeline & Rasterization", Lecture slides for MIT course EECS 6.837, Sep. 2012. pp. 4-6, 54-65. https://ocw.mit.edu/courses/electrical-engineering-and-computer-science/6-837-computer-graphics-fall-2012/lecture-notes/MIT6_837F12_Lec21.pdf.*
PCT International Search Report and Written Opinion of the International Searching Authority for International Application No. PCT/US2017/033109, dated Aug. 18, 2017, 9 pages.

* cited by examiner

*Primary Examiner* — Chong Wu
(74) *Attorney, Agent, or Firm* — Jaffery Watson; Mendonsa & Hamilton LLP

(57) ABSTRACT

One embodiment provides for a graphics processing apparatus comprising first logic to rasterize pixel regions associated with multiple interleaved primitives; second logic to shade pixel regions covered by one or more of the multiple interleaved primitives; and third logic to interleave output of the second logic for the multiple interleaved primitives to a single render target, the single render target including output associated with the multiple interleaved primitives.

20 Claims, 21 Drawing Sheets

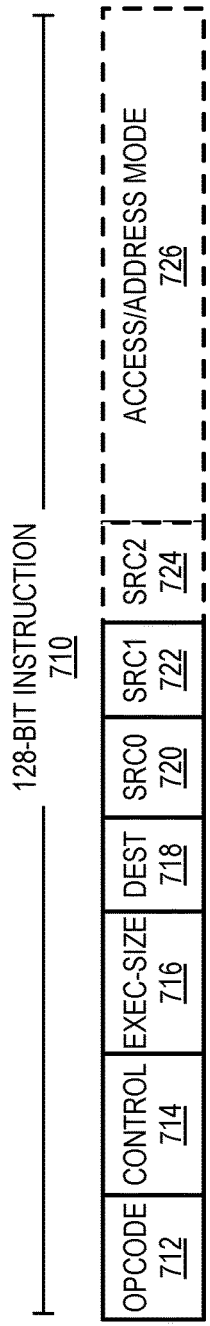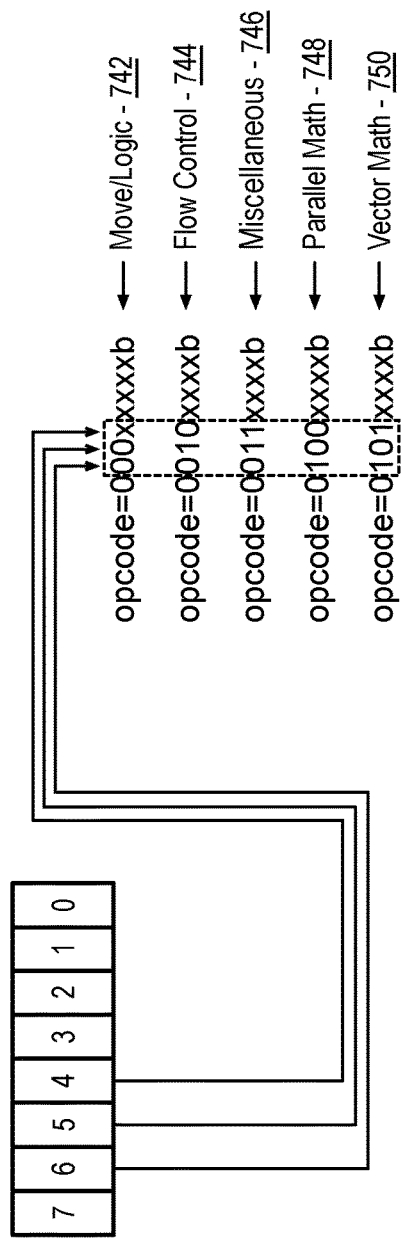
FIG. 7

FIG. 9A GRAPHICS PROCESSOR COMMAND FORMAT
900
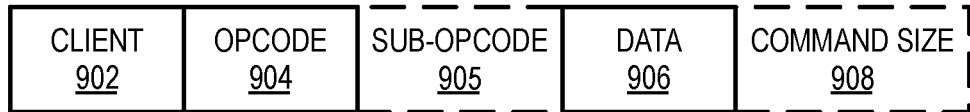
FIG. 9B GRAPHICS PROCESSOR COMMAND SEQUENCE
910
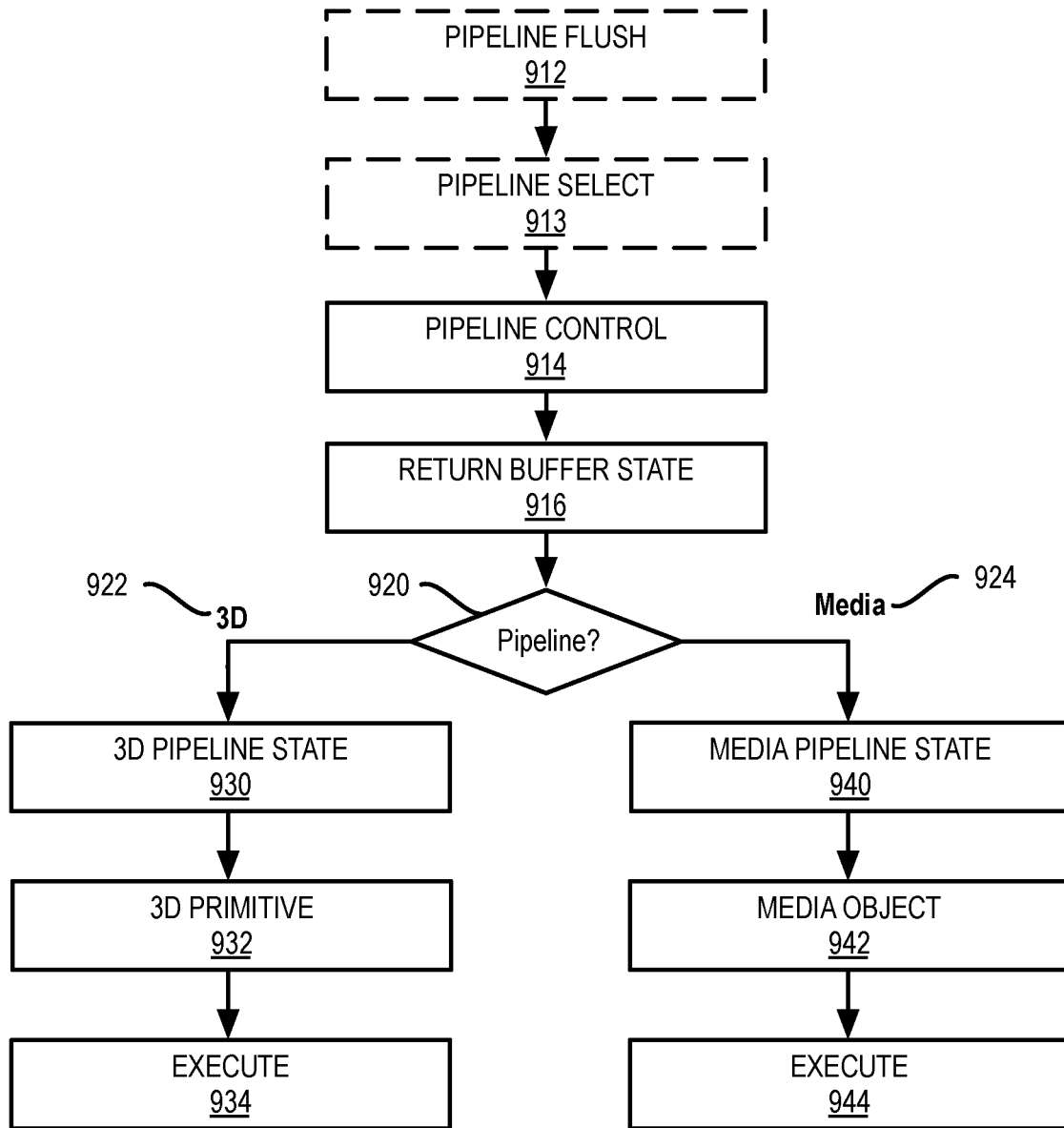

US 10,636,110 B2

ARCHITECTURE FOR INTERLEAVED RASTERIZATION AND PIXEL SHADING FOR VIRTUAL REALITY AND MULTI-VIEW SYSTEMS

TECHNICAL FIELD

Embodiments generally relate to graphics processing logic. More particularly, embodiments relate to interleaved rasterization and pixel shading for Virtual Reality and/or multi-view systems.

DESCRIPTION OF THE RELATED ART

Rasterization is a process by which a scene of three-dimensional (3D) polygons is rendered onto a two-dimensional (2D) surface. The rasterization process can be performed in several stages, including a transformation stage, a clipping stage, and a scan conversion stage. The transformation stage converts 3D polygon vertices to vertices on a 2D plane. Once the vertices are transformed to 2D locations, some of vertices may lie may be outside of the viewing window for the scene. The set of vertices may be clipped, such that only vertices within the scene receive further processing. Once the 3D polygons are transformed to a 2D location and clipped into a viewing window, a scan conversion process is performed to determine which pixels are used to draw the image.

Performing rasterization for VR (virtual reality) systems with HMD (Head mounted displays) require generating two frame buffers corresponding to the views seen from the two eyes at high frame rates for a properly immersive experience, which doubles the burden on the GPU unless some clever techniques are used.

BRIEF DESCRIPTION OF THE DRAWINGS

The various advantages of the embodiments will become apparent to one skilled in the art by reading the following specification and appended claims, and by referencing the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

DETAILED DESCRIPTION

Figure 1:
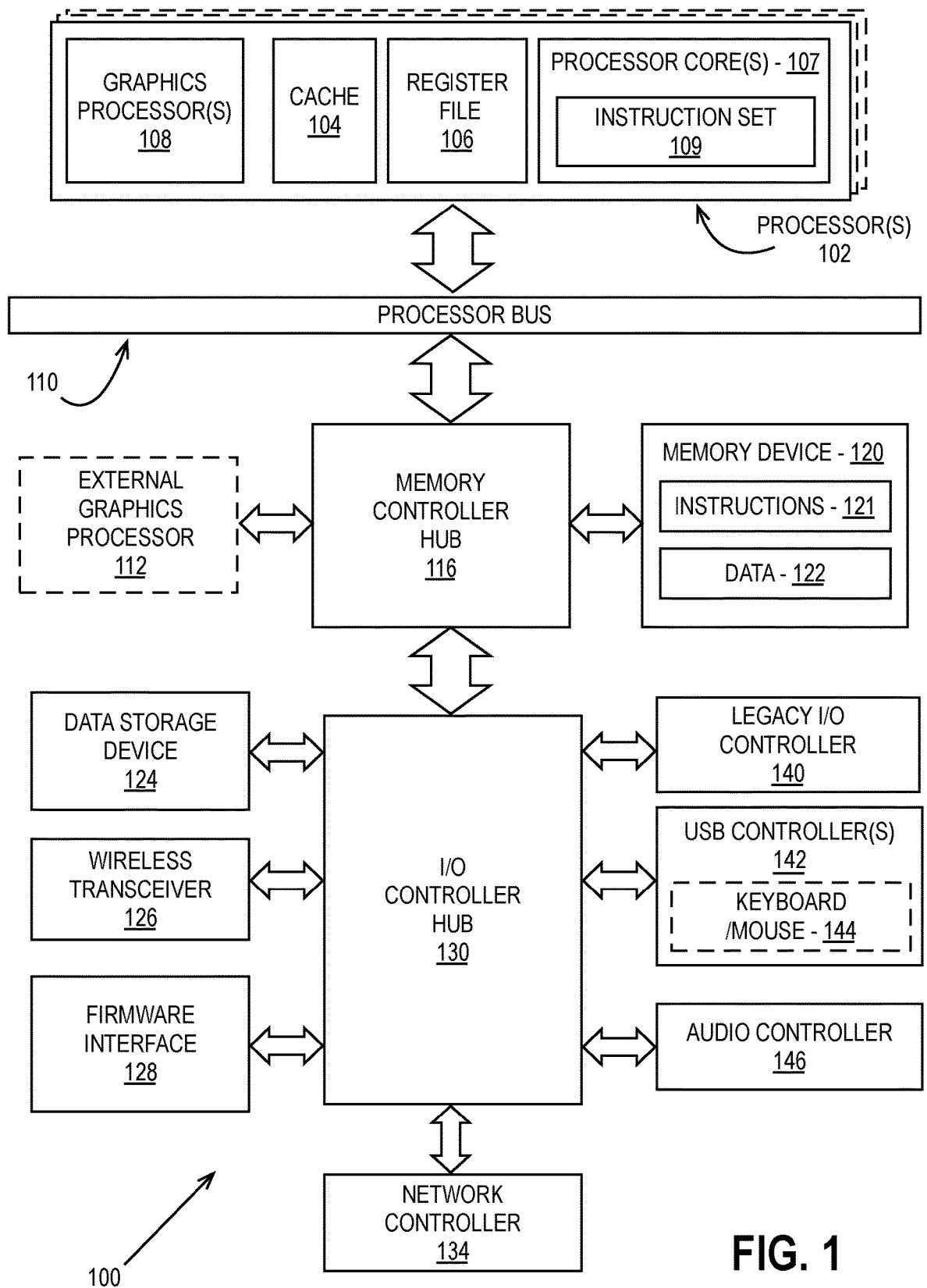
FIG. 1 is a block diagram of an embodiment of a computer system with a processor having one or more processor cores and graphics processors.

One possible technique is to generate the two sets of viewport positions in the vertex shader, one corresponding to each viewport, which avoids the need for the geometry shader (GS) to generate two triangles that get rendered into two viewports. Embodiments described herein extend such techniques further downstream in the rendering pipeline and provides an interleaved architecture for rasterization and pixel shading. In one embodiment the interleaving of the items is performed with respect to pairs of primitives, including tiles within the primitive during rasterization and the pixel data for the primitives during pixel shading. The interleaved architecture increases the temporal locality associated with the processing the primitives, including increased temporal locality of texture data accessed during pixel processing.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14 provide an overview of exemplary data processing system and graphics processor logic that incorporates or relates to the various embodiments. FIGS. 14-21 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
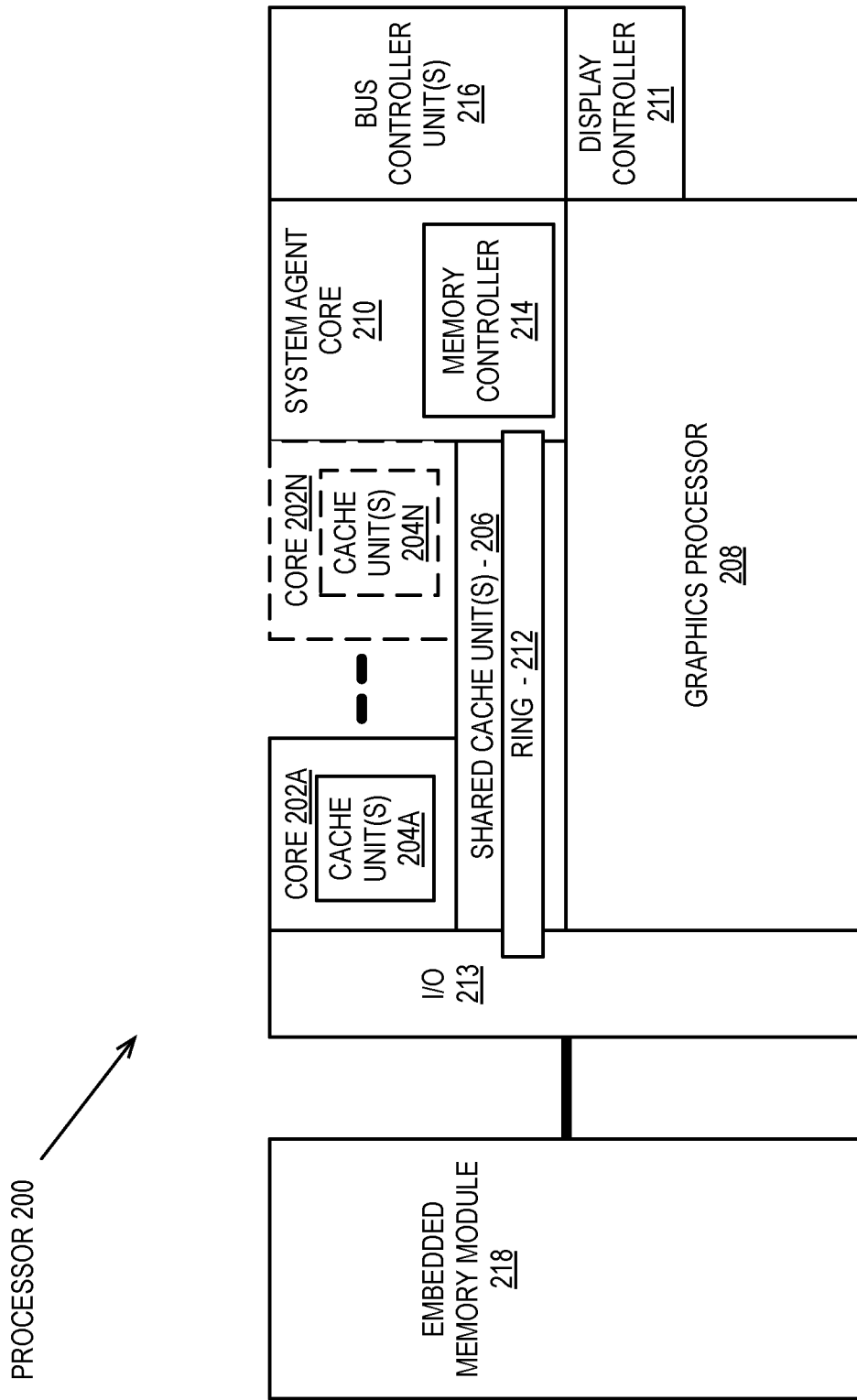
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N.

In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
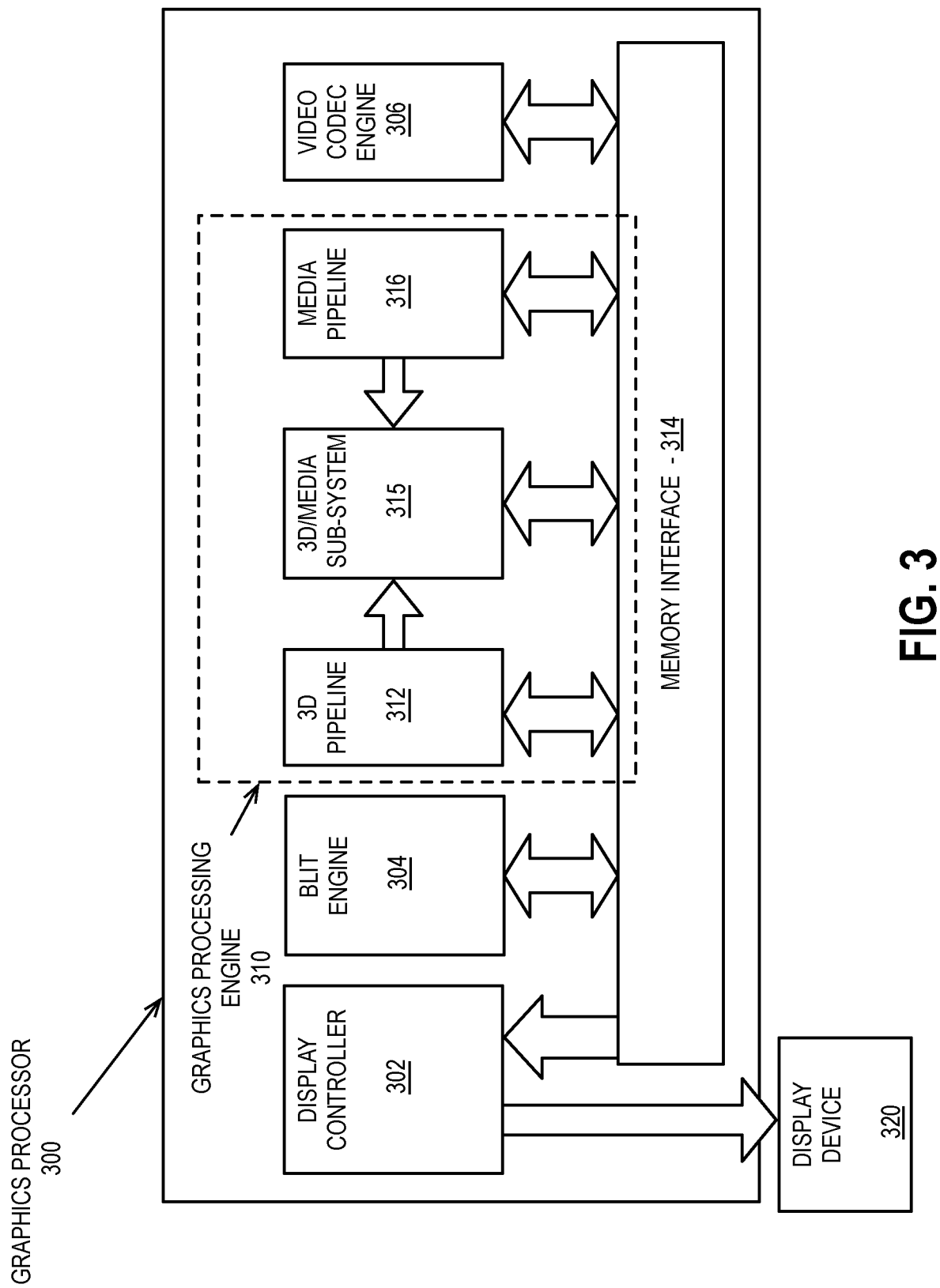
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
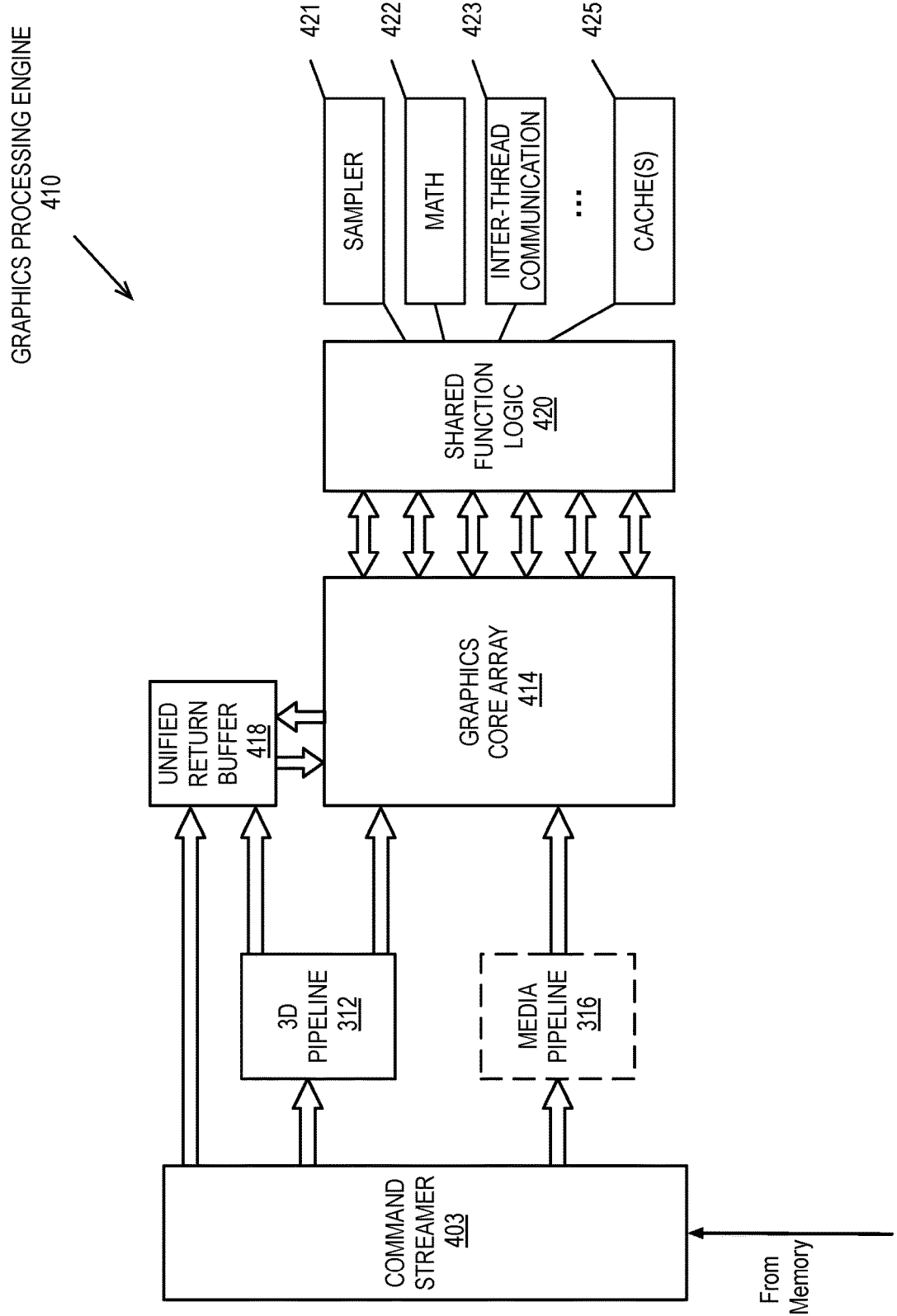
FIG. 4 is a block diagram of an embodiment of a graphics processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
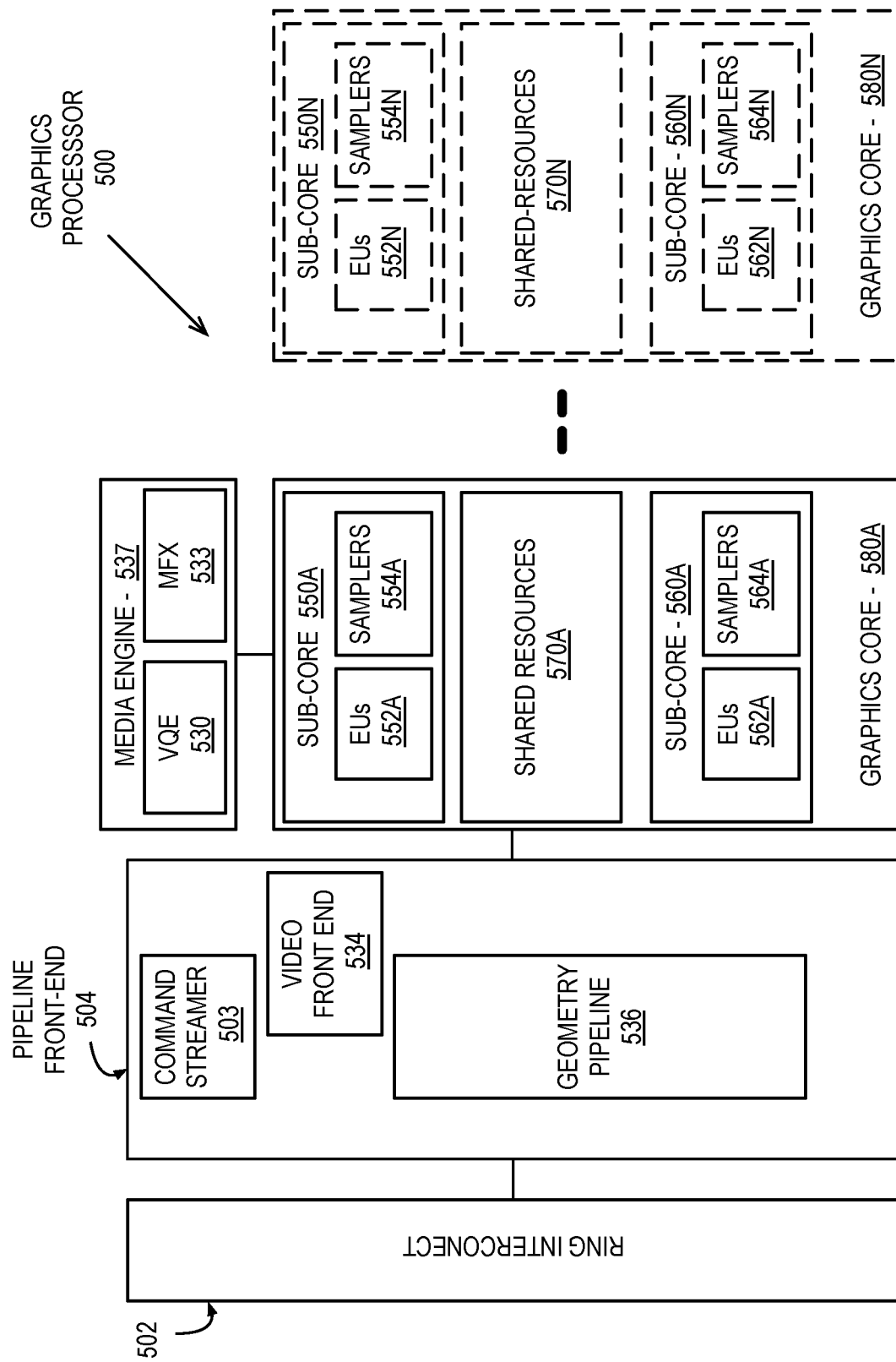
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
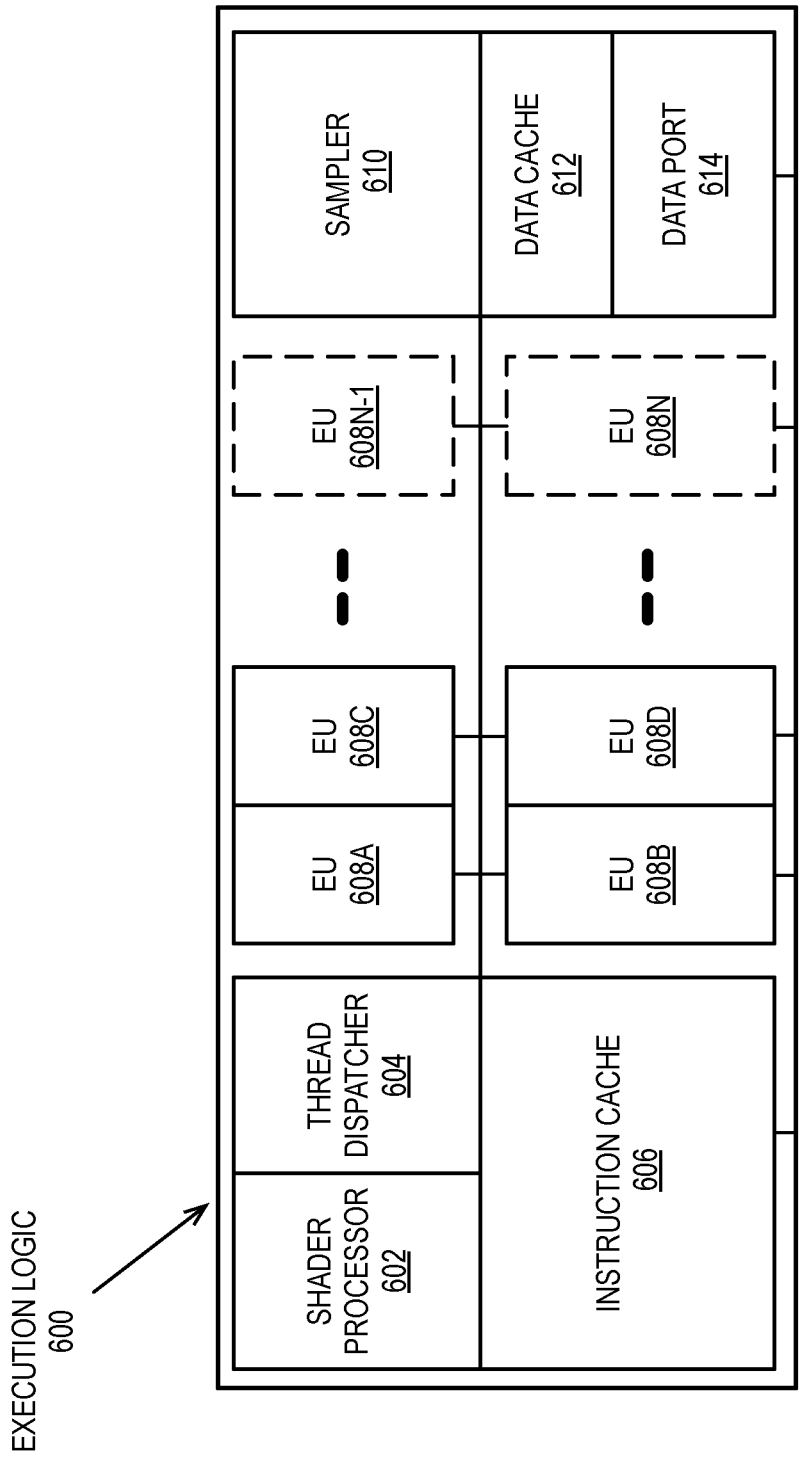
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic opcode group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
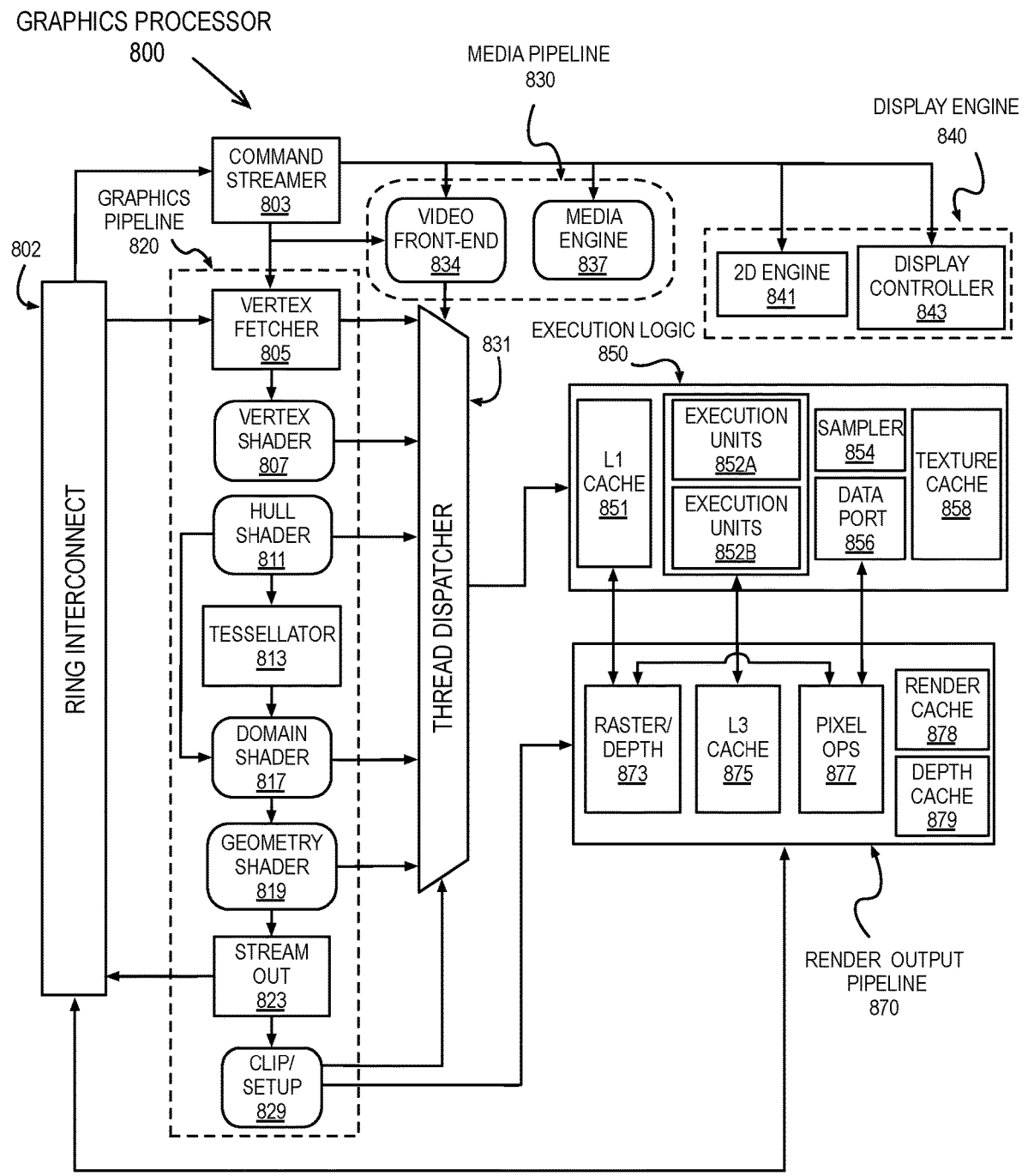
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
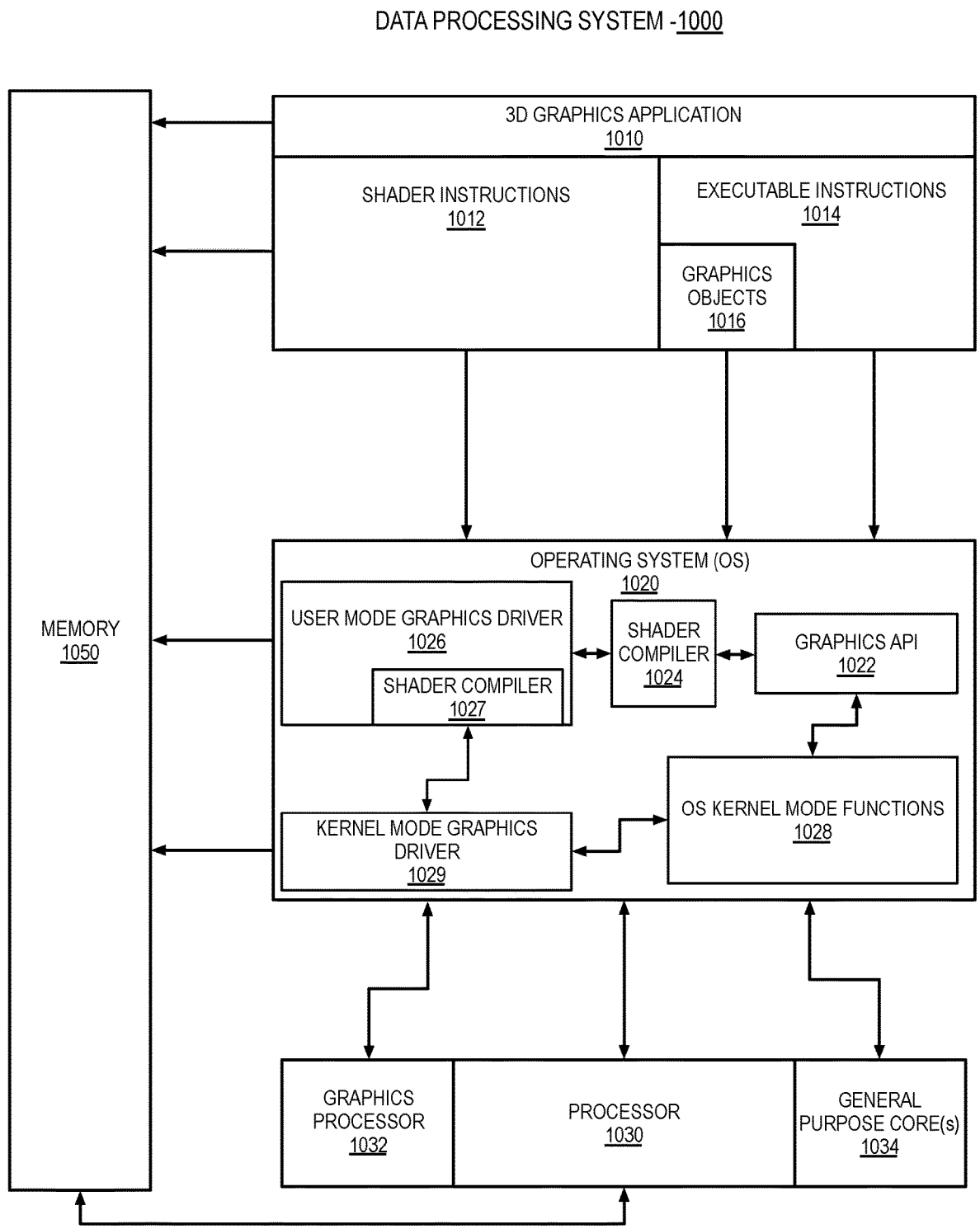
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
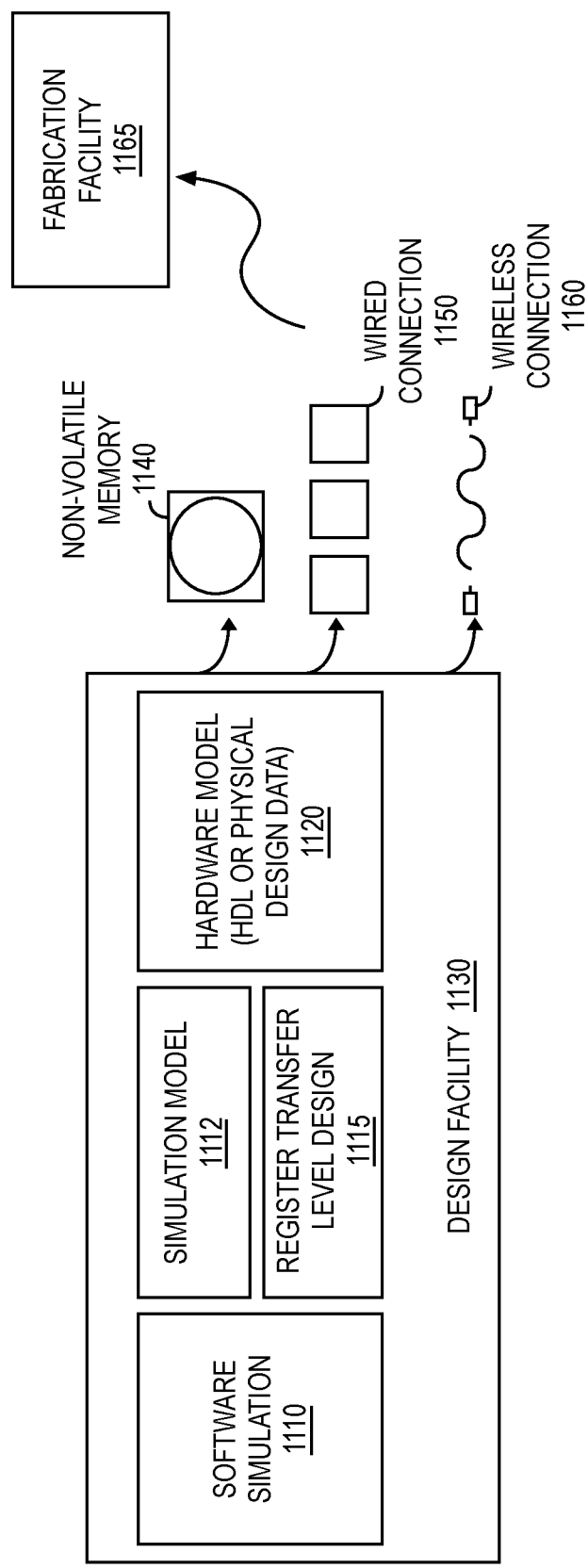
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuits

Figure 12:
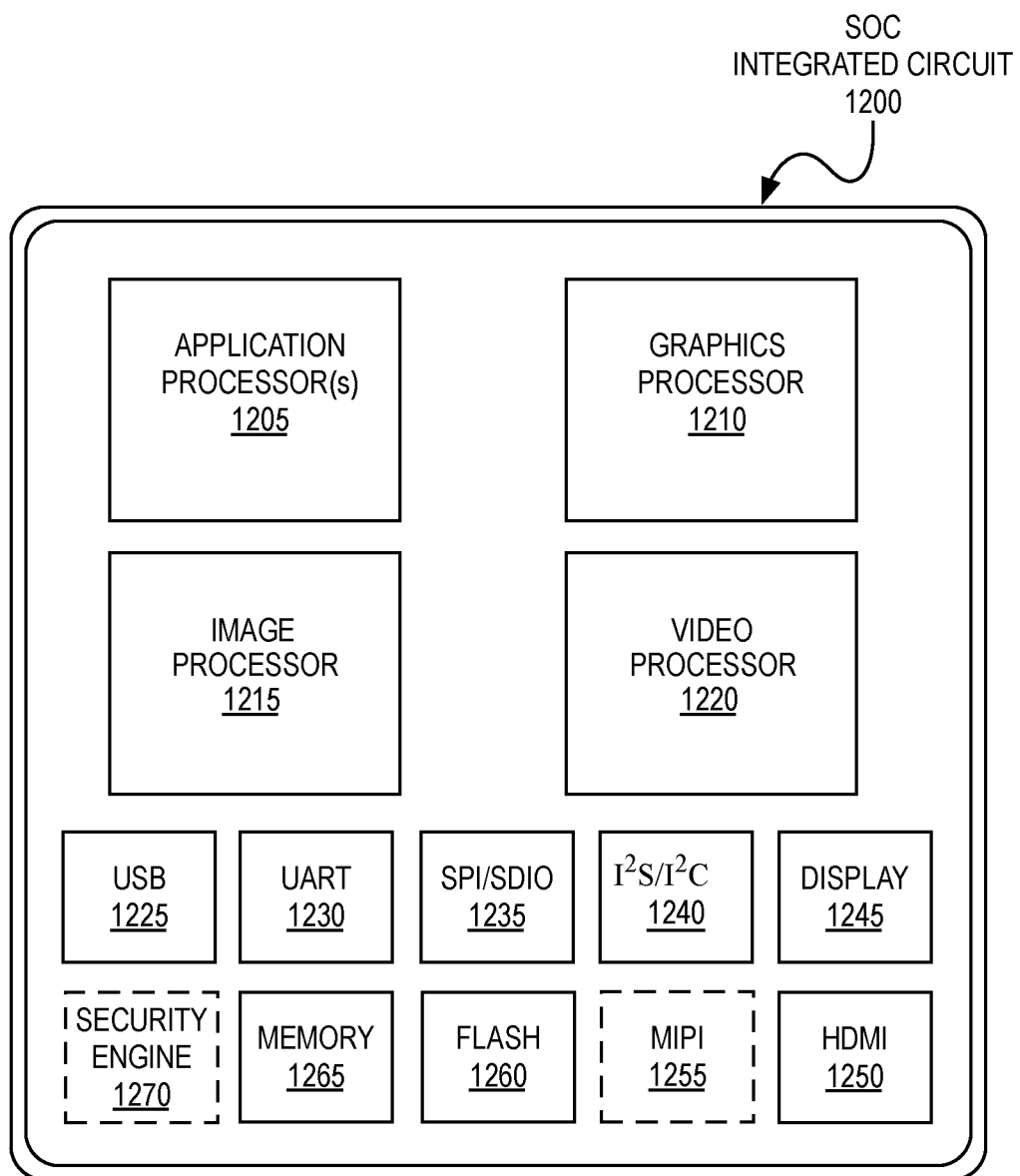
FIG. 12 is a block diagram illustrating an exemplary system on a chip integrated circuit that may be fabricated using one or more IP cores, according to an embodiment.
Figure 13:
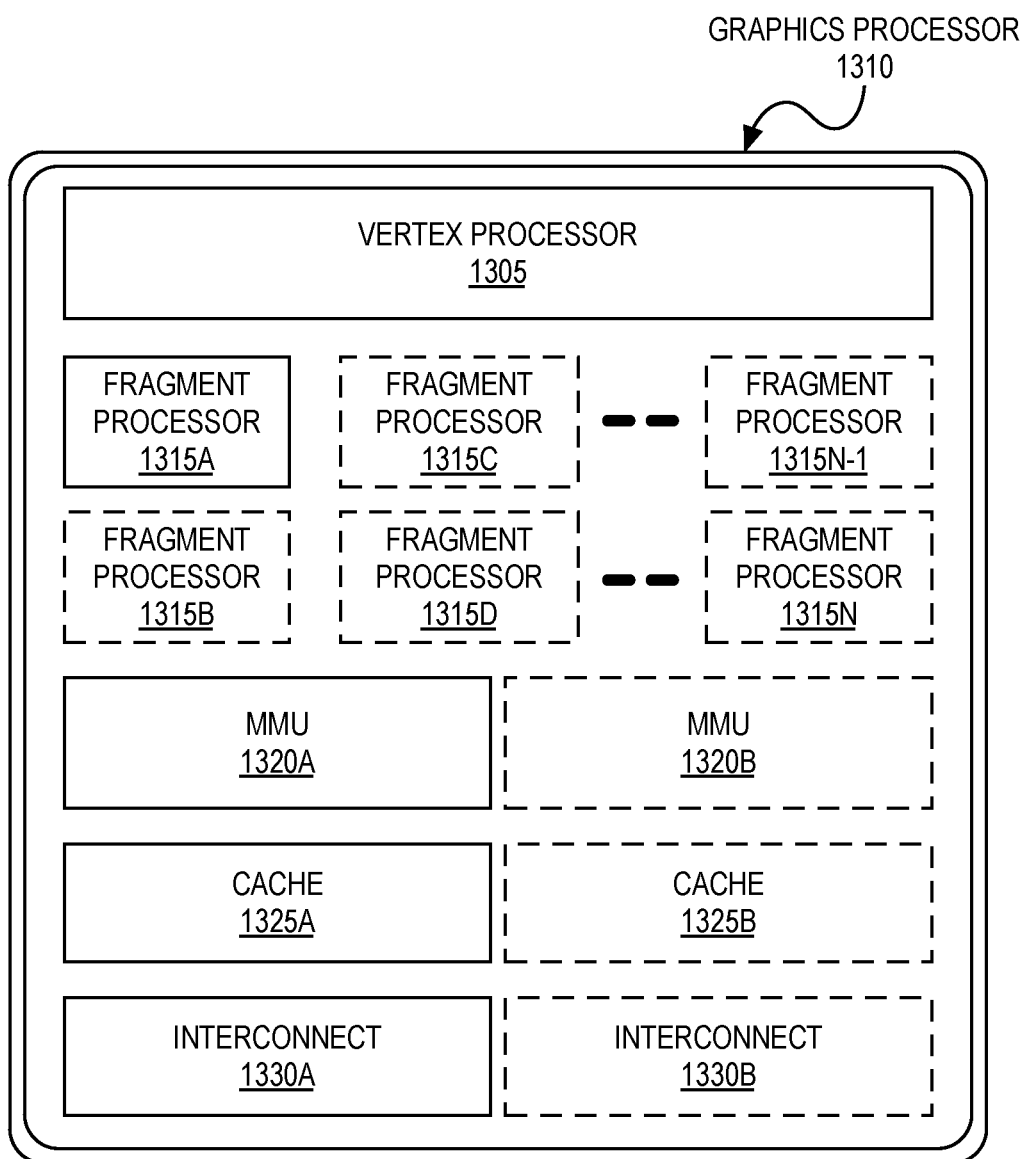
FIG. 13 is a block diagram illustrating an exemplary graphics processor of a system on a chip integrated circuit.
Figure 14:
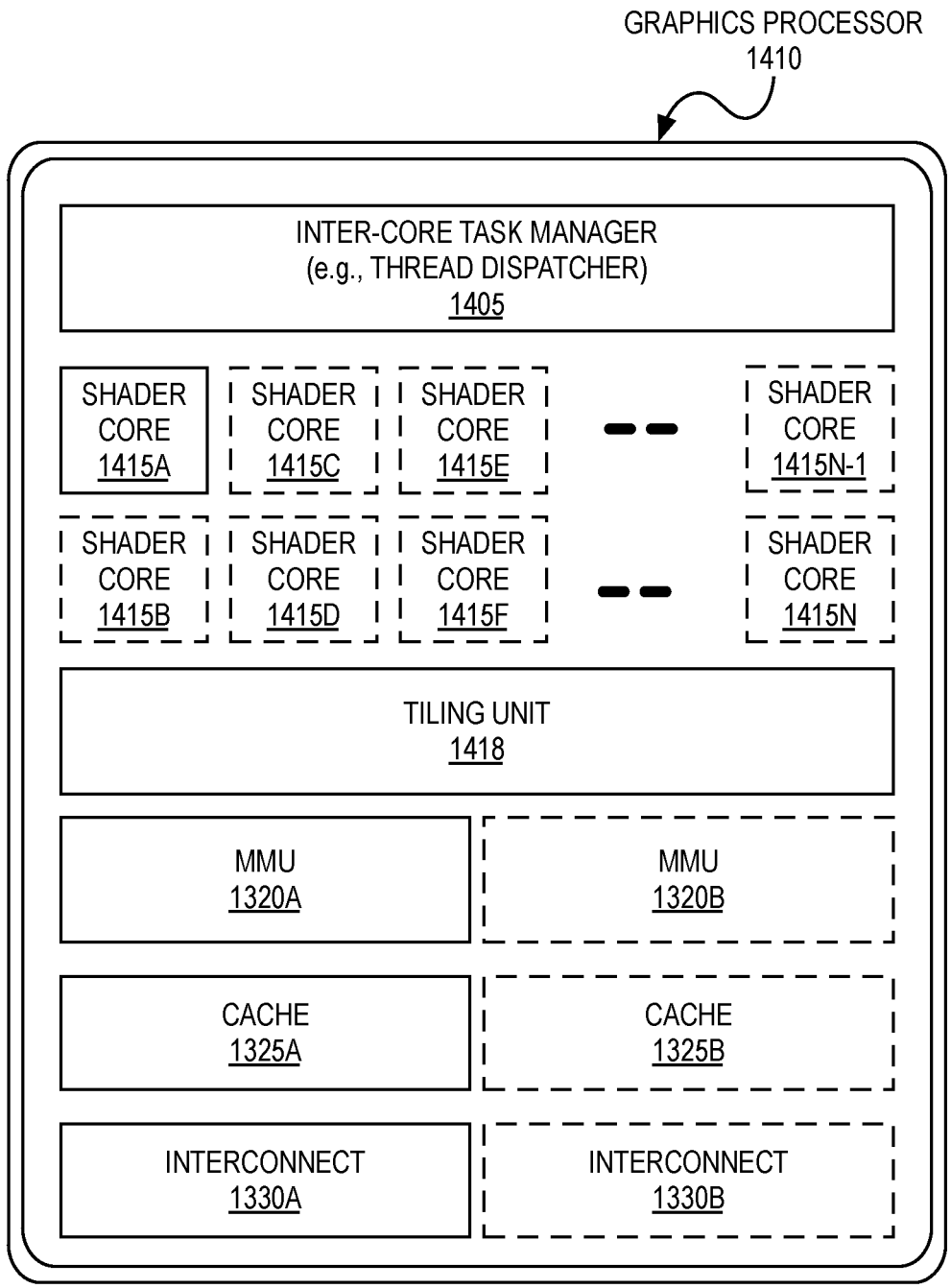
FIG. 14 is a block diagram illustrating an additional exemplary graphics processor of a system on a chip integrated circuit.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A-1315N. Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for integrated circuit 1300, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, caches 1325A-1325B, and circuit interconnect(s) 1330A-1330B of the integrated circuit 1300 of FIG. 13.

Graphics processor 1410 includes one or more shader core(s) 1415A-1415N, which provides for a unified shader core architecture in which a single core or type or core can execute all types of programmable shader code, including vertex shaders, fragment shaders, and compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Rasterization Overview

Embodiments described herein provide optimized rendering techniques that make use of hierarchical rasterization. A rasterization overview is provided by FIG. 15-16.

Figure 15:
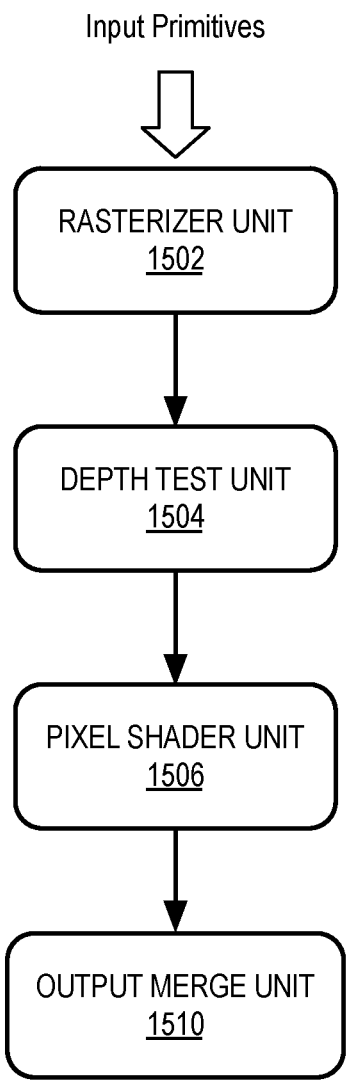
FIG. 15 is a block diagram of a graphics rendering pipeline, according to an embodiment.

FIG. 15 is a block diagram of a graphics rendering pipeline 1500, according to an embodiment. In one embodiment the graphics rendering pipeline 1500 includes a rasterization unit 1502, a depth test unit 1504, a pixel shader unit 1506, and an output merge unit 1510. The rasterization unit 1502 can be configured to convert 3D geometric primitives such as rectangles, triangles, lines, etc., into fragments using one of several available rasterization algorithms. In one embodiment, a hierarchical rasterization algorithm is used. The depth test unit 1504 can be used to process fragments output by the rasterization unit 1502. In one embodiment the depth test unit 1504 may be an early depth test unit. The pixel shader unit 1506 generates pixels based the input fragments and the resulting pixels can be sent to the output merge unit 1510 before being written to a render target.

Figure 16:
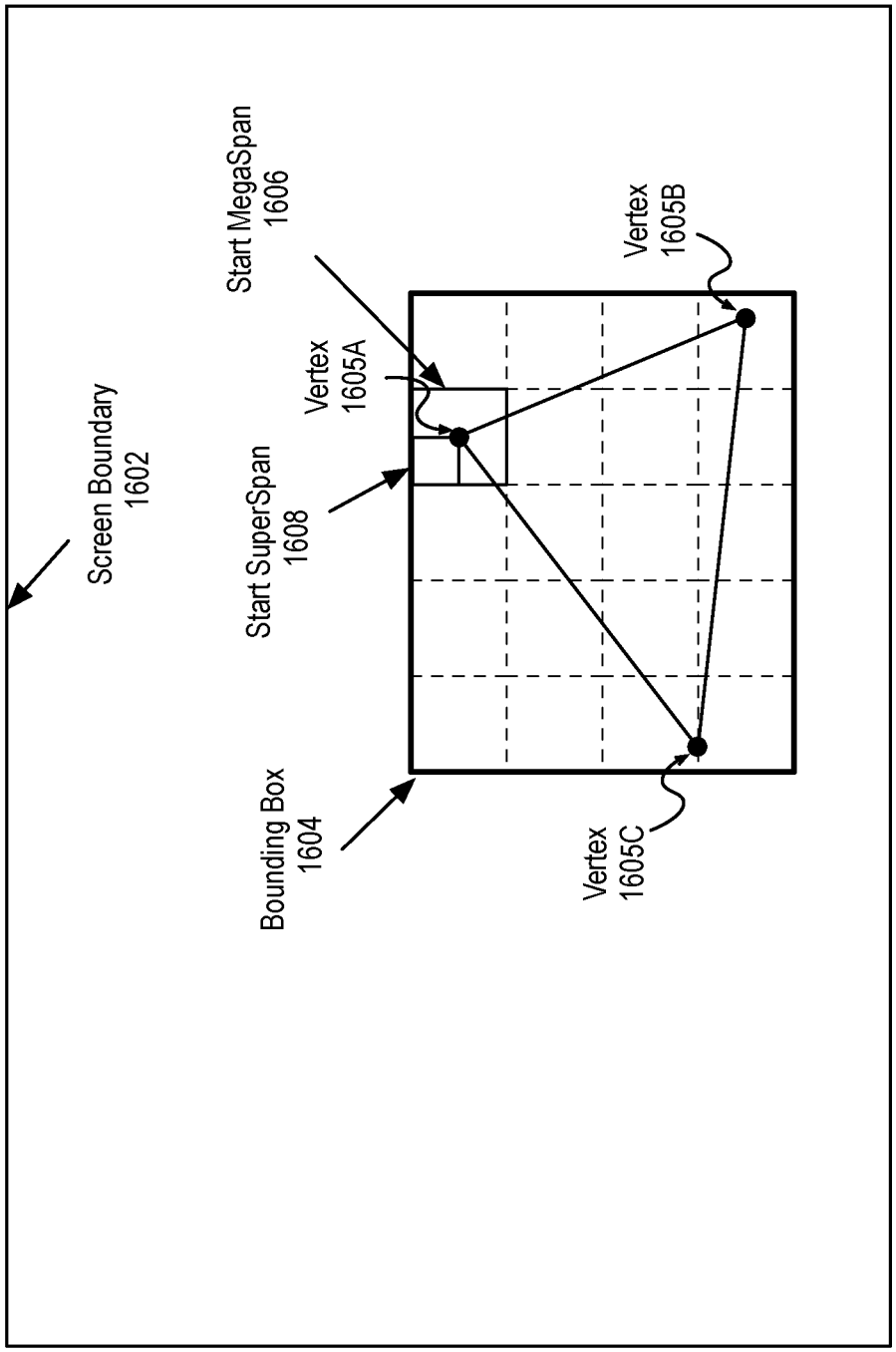
FIG. 16 is an illustration of exemplary rasterization elements.

FIG. 16 is an illustration of exemplary rasterization elements 1600. A triangle is illustrated which is defined by three vertices (e.g., vertex 1605A-C). A bounding box 1604 can be drawn around the triangle and a coarse level iterator can iterate through successive megaspan blocks (e.g., 16×16 blocks) of pixels beginning with a start megaspan 1606. The start megaspan 1606 can include four superspan quadrants, including a start superspan 1608. Block selection logic can be configured to select the screen space coordinates of the start megaspan 1606 or start superspan 1608 as an initial block of pixels and edge test logic can analyze the initial block of pixels to determine a set of fully covered quadrants of the initial block of pixels.

The edge determination logic can additionally analyze a block of pixels adjacent to the initial block of pixels (e.g., an adjacent megaspan) to determine whether the block of adjacent pixels is void, meaning that no samples within the selected block of pixels are within the triangle, indicating that the selected block of pixels is completely outside of the triangle. Megaspans that are completely outside of the triangle can be discarded and further iteration is not performed on those blocks. For each partially covered megaspan, an additional coverage check can be performed to determine a finer level of coverage at the superspan (e.g., 8×8), span (e.g., 4×4), subspan (e.g., 2×2), and pixel level as shown in FIG. 15.

While rasterization is generally described herein at the pixel sample level, embodiments also support multi-sample anti-aliasing (MSAA), in which multiple sample locations are used for each pixel. For example, where 4×MSAA is enabled, screen coverage values for polygon primitives may be determined using 4 sample points per pixel. However, to avoid obscuring the details of the embodiments, concepts will generally be described using one sample point at the center of each pixel.

Interleaved Rasterization

Embodiments described herein provide for interleaved rasterization of multiple primitives. The use of interleaved rasterization can result in significant re-use of data when processing the second primitive for a virtual reality system. Typical steps involved in processing the primitive are set-up, clipping, hierarchical rasterization and pixel shading. Hierarchical rasterization, as illustrated in FIG. 16, can be used to determine which tiles are covered by a primitive in order to shade the covered tiles before moving to the next primitive. In the case of VR, the next primitive happens to be same primitive as seen from a different eye's perspective. In other words, tile rasterization interleave performs interleaved rendering of the two primitives that, in one embodiment, are being rendered into two frame buffers, one frame buffer for each eye.

Tile rasterization interleave increases the temporal locality of texture accesses made by the pixels from the two primitives. Embodiments proposed herein process the tiles that are covered by the union of the bounding boxes of the two primitives in an interleaved way. In one embodiment rendering logic processes the same tile against the first primitive (e.g. corresponding to the left eye), followed by the second primitive (e.g. corresponding to the right eye) before moving on to the next tile. Interleaved rasterization makes it likely that texture requests for the pixels from the second primitive will result in a cache hit due to the temporal locality of the access. In one embodiment context switching logic is enhanced to enable a fine-grain context switch between the two primitives that are being rendered.

When performing interleaved rasterization, If the triangles go through drastically different perspective transformation for the two eyes, for example, if the primitive is very close to the eyes, the texels they access may be different, resulting in degraded performance. To avoid performance degradation, the architecture can fall back to processing one primitive in entirety before moving on to the next one in the event the degree of overlap between the primitives is less than optimal. The extent of the overlap can be determined as the ratio of the area of intersection of the bounding boxes of the two triangles in screen space to the area of their union. When there is no overlap, this ratio is 0.0. For completely overlapping triangles, ratio is 1.0.

Figure 17:
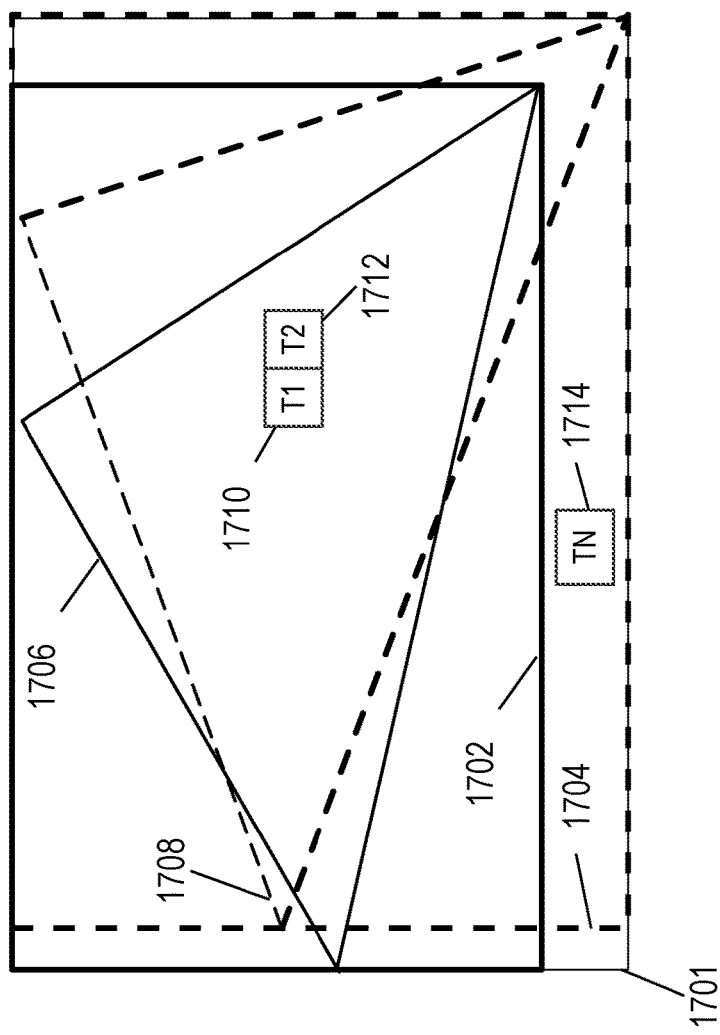
FIG. 17 is an illustration of tile rasterization interleave according to an embodiment.

FIG. 17 is an illustration of tile rasterization interleave 1700 according to an embodiment. As shown in FIG. 17, for each primitive P to be rendered, the primitive can be rendered as a first primitive 1706 from the perspective of a first eye view to be rendered and as a second primitive 1708 from the perspective of a second eye view. An overlay of the render targets for the first primitive 1706 and the second primitive 1708 is shown.

To perform the tile rasterization interleave 1700, the bounding boxes of individual primitives are determined. The bounding boxes include a first bounding box 1702 for the first primitive 1706 and a second bounding box 1704 for the second primitive 1708. A third bounding box 1701 can also be determined, which is a union of the first bounding box 1702 and the second bounding box 1704.

The tiles within the third bounding box 1701 can be traversed and tested against the edges of the first primitive 1706, followed by the edges of the second primitive 1708, to determine which primitives cover the tile. For example, the rasterization logic can be configured to rasterize a first tile T1 (1710) against both the first primitive 1706 and the second primitive 1708 before moving to a second tile (1712). All tiles within the third bounding box 1701 can be rasterized. Accordingly, some tiles (e.g., TN 1714) may be rasterized against a primitive (e.g., the first primitive 1706) even though it can be determined that the tile is outside of the first bounding box 1702 for the first primitive 1706. While this excess rasterization may result in excess work, in one embodiment, no significant power or performance impact occurs unless little or no overlap exists between the first bounding box 1702 and the second bounding box 1704. In the event the overlap ratio is determined to be below a threshold, the logic can fall back to non-interleaved rasterization to avoid processing a large number of unnecessary tiles.

Once coverage testing is performed for the tiles, the tiles can be processed by the pixel shader. If a given tile is covered by only one of the primitives, only the covered primitive is rendered. If the tile is covered by both the primitives, pixels covered by the first primitive are shaded, followed by pixels covered by the second primitive. The pixel shader can avoid shading two different primitives at a time, which reduces register pressure within the pixel shader.

In one embodiment texture cache performance can be increased by interleave sub-tiles, quads, or pixels from the two primitives while shading, which improves texture access coherence due to the increased locality of access, which results in an increase in performance and a reduction in power consumption. An additional benefit of interleaving pixels or quads from two triangles is realized when the rendered triangles are relatively small, as SIMD utilization may be greater for smaller triangles, as the graphics architecture may be able to shade multiple triangles in a single SIMD batch. However, if pixels from different primitives are grouped together in a SIMD batch, the register pressure increases due to the larger amount of data to be processed. Accordingly, there is a trade-off between the texture cache performance and the register pressure based on the choice between interleaving the tiles or pixels.

Code 1 and Code 2 below illustrates pseudo code associated with a legacy mechanism of rasterization an pixel shading compared to the method proposed by embodiments described herein.

| Code 1: Pseudo-code for legacy VR rasterization. | Code 2. Pseudo-code for Tile Rasterization Interleave |
|---|---|
| foreach p (P1, P2) {<br>  BBox = BoundingBox(p);<br>  foreach tile ( BBox ){<br>    Rasterize(tile, p)<br>    EarlyDepthStencil( )<br>    PixelShade( )<br>    OutputMerge( )<br>  }<br>} | BBox1 = BoundingBox(P1);<br>BBox2 = BoundingBox(P2);<br>foreach tile (BBox1 + BBox2){<br>  foreach p(P1, P2) {<br>    Rasterize(tile, p)<br>    EarlyDepthStencil( )<br>    PixelShade( )<br>    OutputMerge( )<br>  }<br>} |

Code 1 shows legacy logic, which processes each tile within a first primitive before processing the tiles of a second primitive. interleaved Tile rasterization is shown in Code 2. The interleaved tile rasterization logic processes tiles within a bounding box that is a union of the bounding boxes of the two primitives. The logic can process each tile against the first primitive, then against the second primitive.

Using the tile interleaved rasterization logic, when rasterizing a VR scene having large triangles that are distant from both eye points, texture bandwidth consumed should not increase significantly due to the increased texture cache usage realized by interleaving the tiles of both eyes.

In some implementations, large tiles can reduce the temporal coherence improvement realized by interleaving, as texels accessed by earlier pixels may be evicted from texture cache by those accessed by later pixels. In one embodiment, interleaving can be performed on a sub-tile basis, such that pixel quadrants or pixels from the two tiles are interleaved. The level at which interleaving is done can depend on the size of the tiles being rasterized, size of texture cache, filtering mode (anisotropic requires more texels than trilinear), or number of textures and the bit-depth per pixel of an individual texel. As a result of this interleaving quads or pixel in one SMID batch, in one embodiment the downstream hardware (e.g., output merge unit 1510) can be implemented with the ability to read and write into two render targets at the same time. Alternatively, the output merge unit can be configured to interleave pixels or pixel groups of the stereo render targets into an interleaved render target, which can be used reduce the amount of bandwidth required at the output merge stage. As the two render targets contain different views of the same primitive, the output colors for two interleaved pixels are likely to be the same or similar in color. Color compression logic can be used to compress the colors of the pixels. The performance of the color compression algorithm can increase significantly when the colors of the pixels in a compressed region are similar.

Interleaved Render Targets

Figure 18:
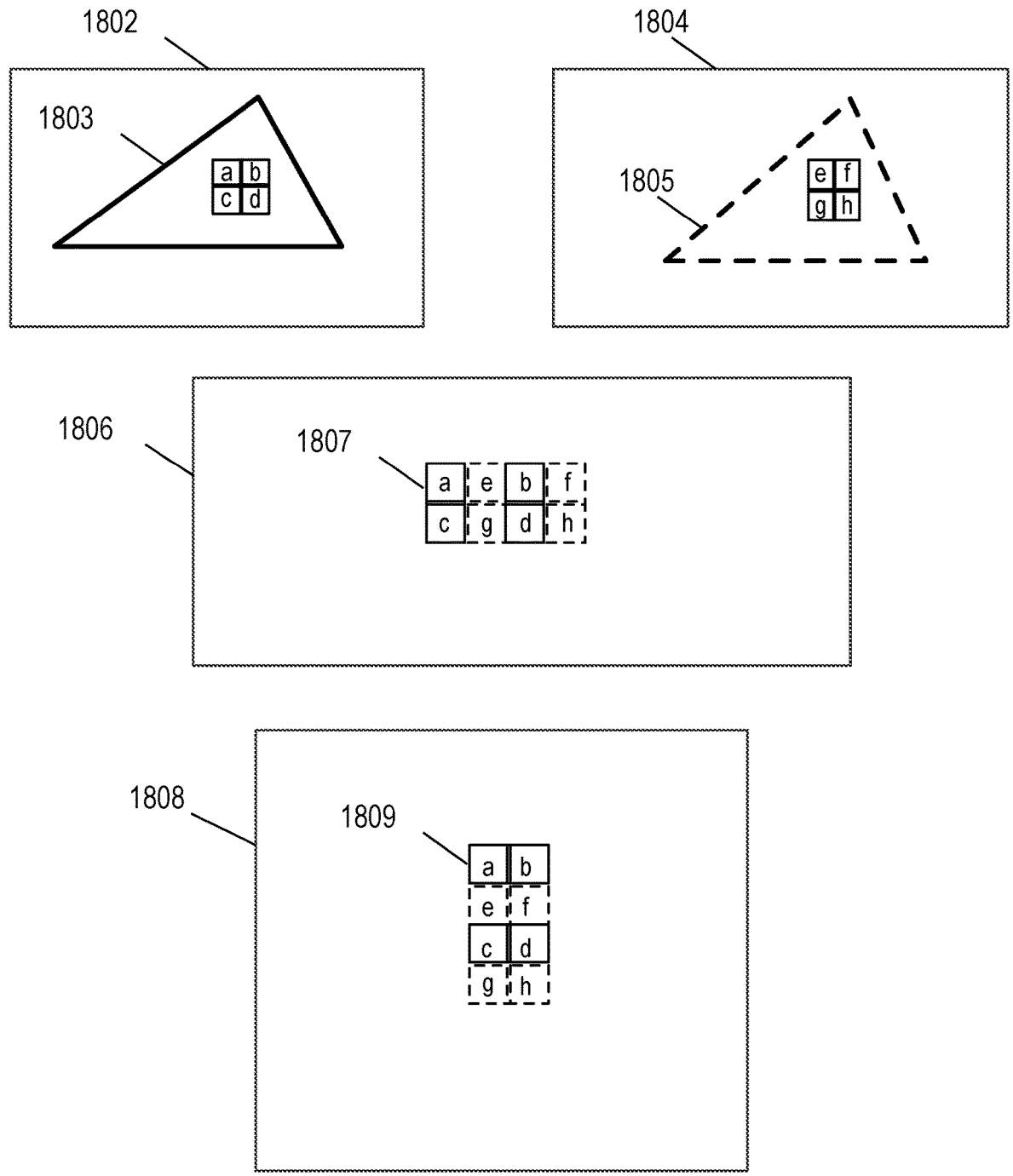
FIG. 18 is an illustration of interleaved render targets, according to an embodiment.

FIG. 18 is an illustration of interleaved render targets 1800, according to an embodiment. In previous implementations, a first render target 1802 for a first eye view could contain pixels (a, b, c, d) associated with a first primitive 1803. A second render target 1804 for a second eye view could contain pixels (e, f, g, h) associated with a second primitive 1805. However, the pixels associated with first primitive 1803 and pixels associated with the second primitive 1805 are simply different views of the same primitive and may have similar color data.

In one embodiment, instead of writing pixels into separate render targets, an interleaved render target 1806 OR 1808 can be used. A horizontally interleaved render target 1806 can be used or a vertically interleaved render target 1808 can be used, depending on which method of interleave produces better compression on the type of content being rendered. The dimensions of each interleaved render target 1806 and 1808 are larger than the dimensions of the original render target, as the interleaved render targets 1806, 1808 would each store all of the pixel data from the separate render targets 1802, 1804. However, either one of interleaved render target 1806 or interleaved render target 1808 would likely present a smoother data set to frame buffer compression algorithms, resulting in an increased compression ratio for the interleaved data.

In one embodiment, blocks of pixels can be interleaved, as opposed to individual pixels. For example, a 2×2 or 4×2 block of pixels can be selected if the resulting compression ratio is higher than using pixel block interleaving, or the pixel block interleave design may be implemented using simpler logic than a per-pixel interleave implementation.

In one embodiment, when an interleaved render target is to be used as an intermediate render target, some logic may de-interleave the any interleaved surfaces before those surfaces are bound as textures that are to be sampled and filtered from in subsequent passes. De-interleaving intermediate render targets avoids the need for sampler logic that understands the interleaving method. Additionally if the display logic does not support reading an interleaved render target, surfaces written to an interleaved render-target can be de-interleaved before the surface is consumed by the display pipeline.

Figure 19:
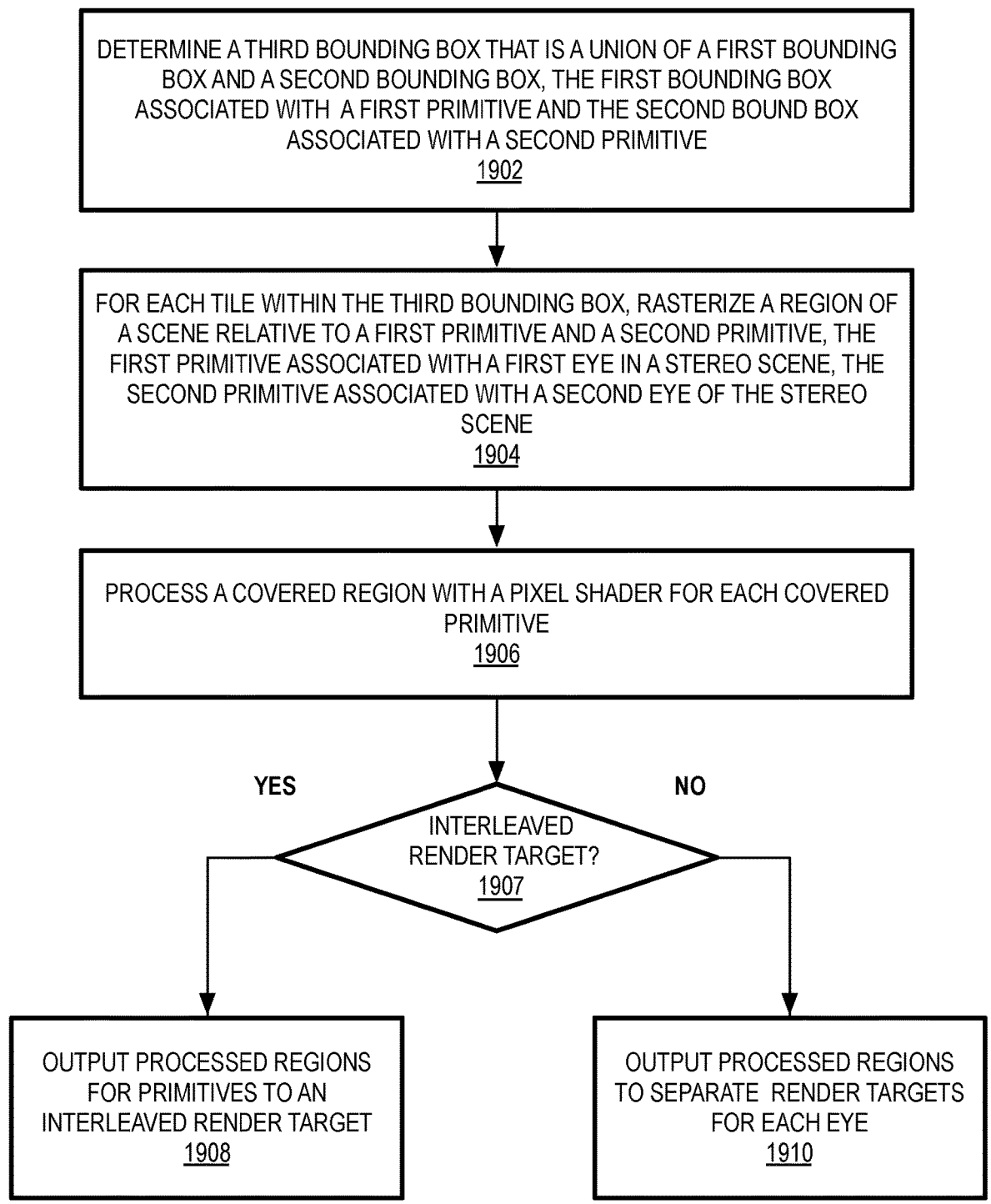
FIG. 19 is a flow diagram of tile rendering interleave logic, according to an embodiment.

FIG. 19 is a flow diagram of tile rasterization interleave logic 1900, according to an embodiment. The tile rasterization interleave logic 1900 can be performed by a graphics rendering pipeline, such as the graphics rendering pipeline 1500 of FIG. 15, which can be performed by graphics processing logic, such as the raster/depth logic 873 of FIG. 8. The tile rasterization interleave logic 1900 can be used to render a stereo scene for a virtual reality application that outputs to a head mounted display.

The tile rasterization interleave logic 1900, in one embodiment, can determine a third bounding box that is a union of a first bounding box and a second bounding box, as shown at 1902. The first bounding box can be associated with a first primitive, while the second bound box can be associated with a second primitive.

The tile rasterization interleave logic 1900, for each tile within the third bounding box, can then rasterize a region of a scene relative to a first primitive and a second primitive. The rasterized region can be a tile, or can be a sub-tile region of the scene such as a pixel quad, or can be an individual pixel. For a stereo rendered VR scene, the first primitive is associated with a first eye, while the second primitive is associated with a second eye. The rasterization includes determining primitive coverage for tiles within the VR scene.

Having rasterized the tile or sub-tile regions against both primitives, the tile rasterization interleave logic 1900 can then process a covered region with a pixel shader for each covered primitive. The pixel shader can process both primitives for a region covered by both primitives, and can process a single primitive for a region covered by a single primitive. When the pixel shader processes a region covered by both primitives, the pixel shader will be processing two primitives that are different views of the same primitive, rather than processing two independent primitives.

Once a region is processed by the pixel shader, the tile rasterization interleave logic 1900, for example, via an output merge unit (e.g., output merge 1510 as in FIG. 15) can output a processed tile to a render target. In one embodiment. the output merge unit can be configured to output to multiple render targets simultaneously. However. one embodiment provides support for the interleaved render targets, such that output for both eyes of a VR scene can be interleaved within a single render target. The tile rasterization interleave logic 1900 can determine whether to output to an interleaved render target at 1907. If the logic is configured to output to an interleaved render target, the logic can output processed regions (e.g., tile regions. sub-tile regions, etc.) to an interleaved render target, as shown at 1908. The interleaved render target can be a horizontally interleaved render target, such as render target 1806 of FIG. 18, or can be a vertically interleaved render target, such as render target 1808 of FIG. 18. In one embodiment, decision to interleave or not can be made on a tile-by-tile basis, and one bit can within tile compression metadata can be used to indicate if a tile is interleaved or non-interleaved. The determination to interleave a render target at 1907 can be performed, in one embodiment. based on a determination that the output color for a processed region has a similarity above a threshold, such that, for example, the total amount of space consumed by the interleaved render target after compression may be less than the total amount of space consumed by separately compressed render targets.

In one embodiment, when the processed region output to the interleaved render target are part of a surface that will be bound to a texture that is to be sampled and filtered, the surface may be de-interleaved before sampling if the sampler does not support the sampling of surfaces from interleaved render targets. Additionally, if the display logic does not support reading an interleaved render target, surfaces written to an interleaved render-target may be de-interleaved before the surface is consumed by the display pipeline.

In the event the interleaved pixels begin to diverge in color, for example, for render target regions that map too closely to the eyes in world space, the rendering logic can fall back to a non-interleaved layout. If the interleaved render targets are disabled, the tile rasterization interleave logic 1900 can configure output logic to fall back to a non-interleaved layout and output the processed regions to separate render targets for each eye, as shown at 1910.

Figure 20:
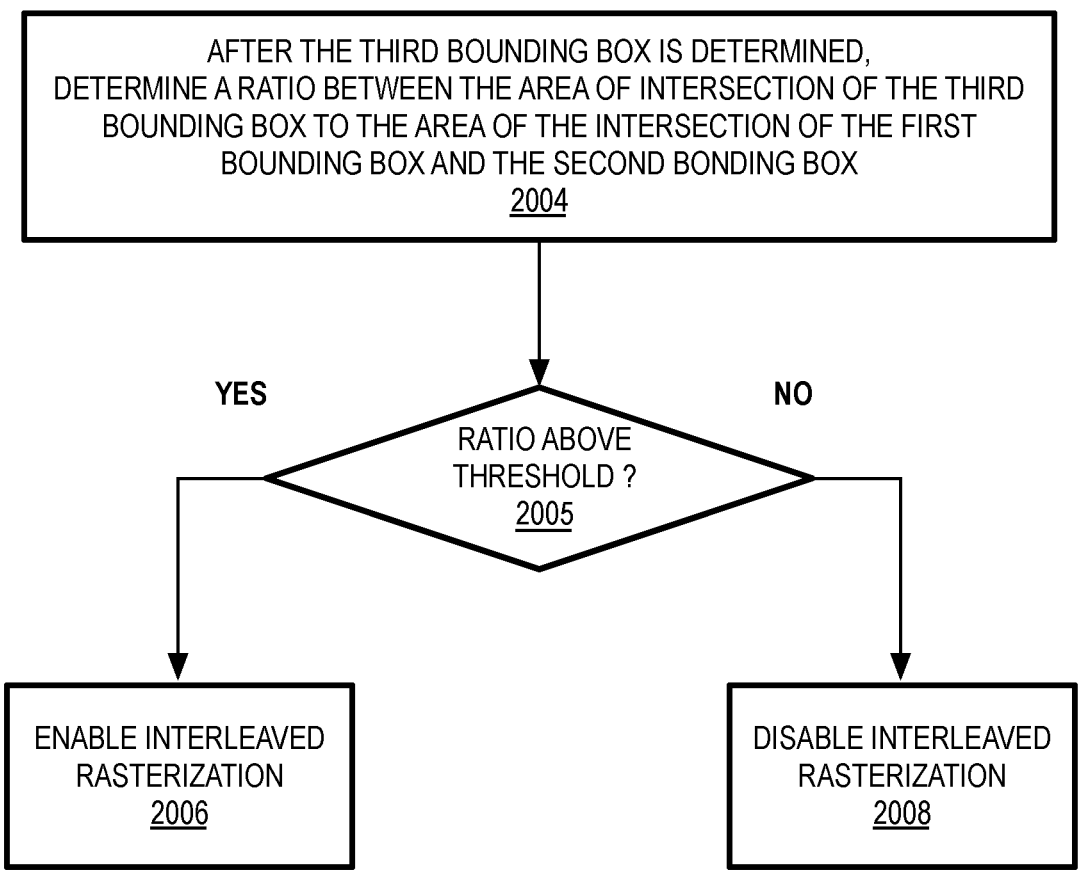
FIG. 20 is a flow diagram of interleaved rasterization fallback logic, according to an embodiment.

FIG. 20 is a flow diagram of interleaved rasterization fallback logic 2000, according to an embodiment. In one embodiment the interleaved rasterization fallback logic 2000 can be performed to determine whether performance would be improved using the interleaved rasterization method descried herein, or whether primitives for each eye view should be separately rasterized.

The interleaved rasterization fallback logic 2000 can be performed, for example, after the third bounding box is determined, as in block 1902 of FIG. 19. As shown at 2004, the interleaved rasterization fallback logic 2000 can determine a ratio between the area of intersection of the bounding boxes to the area of the union of the first bounding box and the second bonding box. This determination can be performed to avoid performance degradation which may result when performing interleaved rasterization on primitives that do not have significant overlap. In the event the degree of overlap is below a threshold, the architecture can fall back to processing one primitive in entirety before moving on to the next one. The extent of the overlap can be determined as the ratio of the area of intersection of the bounding boxes of the two triangles in screen space to the area of their union. When there is no overlap, this ratio is 0.0. For completely overlapping triangles, ratio is 1.0.

As shown at 2005, the logic can determine whether ratio is above a threshold at which performance may increase when performing interleaved rasterization, and enable interleaved rasterization at 2006. If the ratio is below the threshold, the interleaved rasterization fallback logic 2000 can disable interleaved rasterization.

Figure 21:
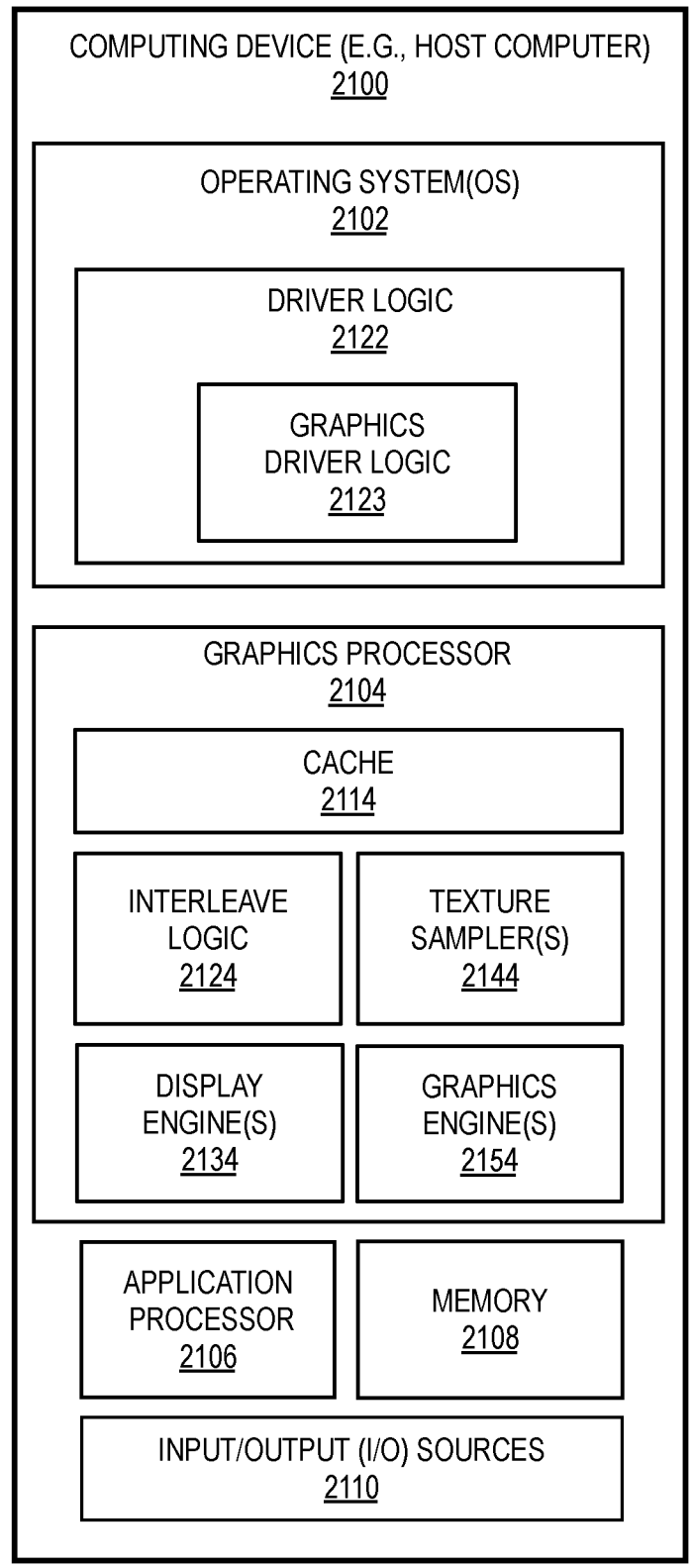
FIG. 21 is a block diagram of a computing device including a graphics processor, according to an embodiment.

FIG. 21 is a block diagram of a computing device 2100 including a graphics processor 2104, according to an embodiment. The computing device 2100 can be a computing device such as the data processing system 100 as in of FIG. 1. The computing device 2100 may also be or be included within a communication device such as a set-top box (e.g., Internet-based cable television set-top boxes, etc.), global positioning system (GPS)-based devices, etc. The computing device 2100 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2100 includes a mobile computing device employing an integrated circuit ("IC"), such as system on a chip ("SoC" or "SOC"), integrating various hardware and/or software components of computing device 2100 on a single chip.

The computing device 2100 includes a graphics processor 2104, which may be any graphics processor described herein. The graphics processor 2104 can include interleave logic 2124, which can be configured to enable interleaved rasterization and pixel shading for virtual reality and multi-view rendering via one or more graphics engine(s) 2154 within the graphics processor 2104. The interleaved surfaces can be de-interleaved before being consumed by one or more texture sampler(s) 2144 or display engine(s) 2134. A cache memory 2114, such as an L3 cache, or other type of cache memory can also be included within the graphics processor 2104. In one embodiment the cache memory 2114 is an embedded memory module, such as the embedded memory modules 218 of FIG. 2. The cache memory 2114 can be used as shared memory which may be accessed by the interleave logic 2124, display engine(s) 2134, texture sampler(s) 2144, and graphics engine(s) 2154.

The graphics processor 2104 also includes one or more display engine(s) 2134 to couple the graphics processor to a display device. Data that is processed by the graphics processor 2104 is stored in a buffer within a hardware graphics pipeline and state information is stored in memory 2108. The resulting image is then transferred to a display controller of the display engine(s) 2134 for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

As illustrated, in one embodiment, in addition to a graphics processor 2104, the computing device 2100 may further include any number and type of hardware components and/or software components, such as (but not limited to) an application processor 2106, memory 2108, and input/output (I/O) sources 2110. The application processor 2106 can interact with a hardware graphics pipeline, as illustrated with reference to FIG. 3, to share graphics pipeline functionality. The application processor 2106 can include one or processors, such as processor(s) 102 of FIG. 1, and may be the central processing unit (CPU) that is used at least in part to execute an operating system (OS) 2102 for the computing device 2100. The OS 2102 can serve as an interface between hardware and/or physical resources of the computer device 2100 and a user. The OS 2102 can include driver logic 2122 for various hardware devices in the computing device 2100. The driver logic 2122 can include graphics driver logic 2123 such as the user mode graphics driver 1026 and/or kernel mode graphics driver 1029 of FIG. 10. In one embodiment the graphics driver logic 2123 includes logic to enable or disable interleaved rasterization and pixel shading logic as described herein.

It is contemplated that in some embodiments, the graphics processor 2104 may exist as part of the application processor 2106 (such as part of a physical CPU package) in which case, at least a portion of the memory 2108 may be shared by the application processor 2106 and graphics processor 2104, although at least a portion of the memory 2108 may be exclusive to the graphics processor 2104, or the graphics processor 2104 may have a separate store of memory. The memory 2108 may comprise a pre-allocated region of a buffer (e.g., framebuffer); however, it should be understood by one of ordinary skill in the art that the embodiments are not so limited, and that any memory accessible to the lower graphics pipeline may be used. The memory 2108 may include various forms of random access memory (RAM) (e.g., SDRAM, SRAM, etc.) comprising an application that makes use of the graphics processor 2104 to render a desktop or 3D graphics scene. A memory controller hub, such as memory controller hub 116 of FIG. 1, may access data in the memory 2108 and forward it to graphics processor 2104 for graphics pipeline processing. The memory 2108 may be made available to other components within the computing device 2100. For example, any data (e.g., input graphics data) received from various I/O sources 2110 of the computing device 2100 can be temporarily queued into memory 2108 prior to their being operated upon by one or more processor(s) (e.g., application processor 2106) in the implementation of a software program or application. Similarly, data that a software program determines should be sent from the computing device 2100 to an outside entity through one of the computing system interfaces, or stored into an internal storage element, is often temporarily queued in memory 2108 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2110 may include one or more I/O devices that are implemented for transferring data to and/or from the computing device 2100 (e.g., a networking adapter); or, for a large-scale non-volatile storage within the computing device 2100 (e.g., hard disk drive). User input devices, including alphanumeric and other keys, may be used to communicate information and command selections to graphics processor 2104. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2100 may be employed to observe gestures, record audio and video and to receive and transmit visual and audio commands.

I/O sources 2110 configured as one or more network interface(s) can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2100 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a graphics processing apparatus comprising first logic to rasterize pixel regions associated with multiple interleaved primitives; second logic to shade pixel regions covered by one or more of the multiple interleaved primitives; and third logic to interleave output of the second logic for the multiple interleaved primitives to a single render target, the single render target including output associated with the multiple interleaved primitives.

One embodiment provides for a data processing system comprising memory to store an interleaved render target, the interleaved render target to store pixel data for multiple primitives associated with a multi-view scene; and a graphics processing apparatus including first logic to rasterize pixel regions associated with multiple interleaved primitives of the multi-view scene, second logic to shade pixel regions covered by one or more of the multiple interleaved primitives, and third logic to interleave output of the second logic for the multiple interleaved primitives to the interleaved render target.

One embodiment provides for a method of rasterizing a pixel region covered by multiple interleaved primitives, the method comprising determining a third bounding box that is a union of a first bounding box and a second bounding box, the first bounding box associated with a first primitive of the multiple interleaved primitives and the second bounding box associated with a second primitive of the multiple interleaved primitives; for each pixel region within the third bounding box, rasterizing a scene region relative to the first primitive and the second primitive; and wherein rasterizing the scene region determining pixel coverage for the scene region relative to the pixel region.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
a processor core having a workload;
an input-output (I/O) controller hub coupled to the processor core and to provide data network, data storage and workload access for the processor core; and
a graphics processor coupled to the I/O controller hub and configured to implement:
first logic to rasterize pixel regions associated with multiple interleaved primitives in a bounding box that includes among the multiple interleaved primitives a first primitive to be rendered as a first eye view of a primitive and a second primitive to be rendered as a second eye view of the primitive;
second logic to shade the pixel regions covered by one or more of the multiple interleaved primitives; and
third logic to interleave the pixel regions shaded by the second logic for the multiple interleaved primitives to pixel regions of an interleaved render target, the interleaved render target including output of the second logic for the pixel regions associated with the first primitive and the second primitive, wherein the pixel region associated with the first primitive is to be displayed on a first display associated with the first eye view and the pixel region associated with the second primitive is to be displayed on a second display associated with the second eye view.

2. The graphics processing apparatus as in claim 1, wherein the first display and the second display are associated with a head mounted display.

3. The graphics processing apparatus as in claim 2, wherein the first logic, to rasterize a pixel region covered by the multiple interleaved primitives, is to determine whether one or more of the multiple interleaved primitives covers the pixel region.

4. The graphics processing apparatus as in claim 3, wherein the first logic is to determine coverage for a first pixel region against each of the multiple interleaved primitives before determining coverage for a second pixel region against each of the multiple interleaved primitives.

5. The graphics processing apparatus as in claim 3, wherein to rasterize the pixel region covered by the multiple interleaved primitives the first logic is to:
determine a third rectangular bounding box that includes a union of a first rectangular bounding box and a second rectangular bounding box, the first rectangular bounding box associated with the first primitive of the multiple interleaved primitives and the second rectangular bounding box associated with the second primitive of the multiple interleaved primitives; and
for each pixel region within the third rectangular bounding box, rasterize a scene region relative to the first primitive and the second primitive, wherein to rasterize the scene region includes to determine pixel coverage for the scene region relative to the pixel region.

6. The graphics processing apparatus as in claim 5, wherein the pixel region is a tile pixel region and the first logic includes a tile-based rasterizer.

7. The graphics processing apparatus as in claim 5, wherein the scene region is one of a tile pixel region or a sub-tile pixel region.

8. The graphics processing apparatus as in claim 7, wherein the scene region is a sub-tile pixel region and the first logic is to determine pixel coverage for a scene relative to the sub-tile pixel region.

9. The graphics processing apparatus as in claim 8, wherein to determine pixel coverage for the scene relative to the sub-tile pixel region includes to determine pixel coverage for a first sub-tile pixel region for the first primitive and to determine pixel coverage for the first sub-tile pixel region for the second primitive before pixel coverage for a second sub-tile pixel region is to be determined.

10. The graphics processing apparatus as in claim 1, wherein the third logic is to interleave output of the second logic for the multiple interleaved primitives to the interleaved render target in response to a determination that output of the second logic for each of the multiple interleaved primitives has a similarity greater than a threshold and write output of the second logic for the multiple interleaved primitives to multiple render targets in response to a determination that output of the second logic for each of the multiple interleaved primitives has a similarity less than the threshold.

11. The graphics processing apparatus as in claim 10, additionally including fourth logic to compress color data for pixels in the pixel regions written to the interleaved render target.

12. A data processing system comprising:
memory to store an interleaved render target, the interleaved render target to store pixel data for multiple primitives associated with a multi-view scene; and
a graphics processing apparatus including first logic to rasterize pixel regions associated with multiple interleaved primitives of the multi-view scene in a bounding box that includes among the multiple interleaved primitives a first primitive to be rendered as a first eye view of a primitive and a second primitive to be rendered as a second eye view of the primitive, second logic to shade pixel regions covered by one or more of the multiple interleaved primitives, and third logic to interleave the pixel regions shaded by the second logic for the multiple interleaved primitives to pixel regions of the interleaved render target, the interleaved render target including output of the second logic for the pixel regions associated with the first primitive and the second primitive, wherein the pixel region associated with the first primitive is to be displayed on a first display associated with the first eye view and the pixel region associated with the second primitive is to be displayed on a second display associated with the second eye view.

13. The data processing system as in claim 12, wherein the interleaved render target is to store pixel data in a horizontal interleave.

14. The data processing system as in claim 12, wherein the interleaved render target is to store pixel data in a vertical interleave.

15. The data processing system as in claim 12, wherein to rasterize the pixel region covered by the multiple interleaved primitives the first logic is to:
determine a third rectangular bounding box that includes a union of a first rectangular bounding box and a second rectangular bounding box, the first rectangular bounding box associated with the first primitive of the multiple interleaved primitives and the second rectangular bounding box associated with the second primitive of the multiple interleaved primitives; and
for each pixel region within the third rectangular bounding box, rasterize a scene region relative to the first primitive and the second primitive, wherein to rasterize the scene region includes to determine pixel coverage for the scene region relative to the pixel region.

16. The data processing system as in claim 15, the first logic further to determine a ratio between an area of the third rectangular bounding box to the area of an intersection of the first rectangular bounding box and the second rectangular bounding box and disable interleaved rasterization in response to a determination that the ratio is below a threshold.

17. A method of rasterizing a pixel region covered by multiple interleaved primitives, the method comprising:
determining a third rectangular bounding box that includes a union of a first rectangular bounding box and a second rectangular bounding box, the first rectangular bounding box associated with a first primitive to be rendered as a first eye view of a primitive and the second rectangular bounding box associated with a second primitive to be rendered as a second eye view of the primitive, wherein the first eye view of a primitive is to be displayed on a first display and the second eye view of the primitive is to be displayed on a second display; and
rasterizing a scene region relative to the first primitive and the second primitive, wherein rasterizing the scene region includes determining pixel coverage for the scene region for the first primitive, determining pixel coverage for the scene region for the second primitive, and re-using data generated when determining pixel coverage for the first primitive while determining pixel coverage for the second primitive.

18. The method as in claim 17, wherein the scene region is one of a tile pixel region or a sub-tile pixel region.

19. The method as in claim 18, wherein the scene region is a subtile pixel region and the method additionally comprises determining pixel coverage for the scene relative to the sub-tile pixel region.

20. The method as in claim 19, wherein determining pixel coverage for the scene relative to the sub-tile pixel region includes determining pixel coverage for a first sub-tile pixel region for the first primitive and determining pixel coverage for the first sub-tile pixel region for the second primitive before determining pixel coverage for a second sub-tile pixel region.

* * * * *